United States Patent [19]

Ferrarini

[11] 4,276,357
[45] Jun. 30, 1981

[54] DEVICE FOR SELF-LEVELING OF ELECTROLYTE IN ELECTRIC ACCUMULATORS

[75] Inventor: Franco Ferrarini, Milan, Italy
[73] Assignee: Fabbrica Italiana Magneti Marelli S.p.A., Italy
[21] Appl. No.: 113,377
[22] Filed: Jan. 18, 1980
[30] Foreign Application Priority Data
  Jan. 26, 1979 [IT] Italy .............................. 19616 A/79
[51] Int. Cl.³ .......................................... H01M 2/00
[52] U.S. Cl. ....................................... 429/63; 429/89; 429/72
[58] Field of Search ................................ 429/61–63, 429/82, 89, 72

[56] References Cited
U.S. PATENT DOCUMENTS

| | | | |
|---|---|---|---|
| 3,732,125 | 5/1973 | Stroh | 429/63 |
| 4,008,355 | 2/1977 | Perkams | 429/63 |
| 4,087,592 | 5/1978 | Okazaki et al. | 429/63 |

*Primary Examiner*—Charles F. Lefevour
*Attorney, Agent, or Firm*—Ostrolenk, Faber, Gerb & Soffen

[57] ABSTRACT

A device for maintaining the electrolyte level in the accumulator of an electric battery includes a pneumatic chamber, with levelling members in it, connected to the accumulator, and a reservoir for supplying liquid to the pneumatic chamber. The levelling members assure a constant level of liquid in the pneumatic chamber. When the electrolyte level in the accumulator drops below a preset limit, the resulting reduction in pressure in the pneumatic chamber permits reservoir liquid to enter the accumulator, until the level of electrolyte in the accumulator rises enough to raise the pressure in the pneumatic chamber to stop flow of liquid into the accumulator.

23 Claims, 6 Drawing Figures

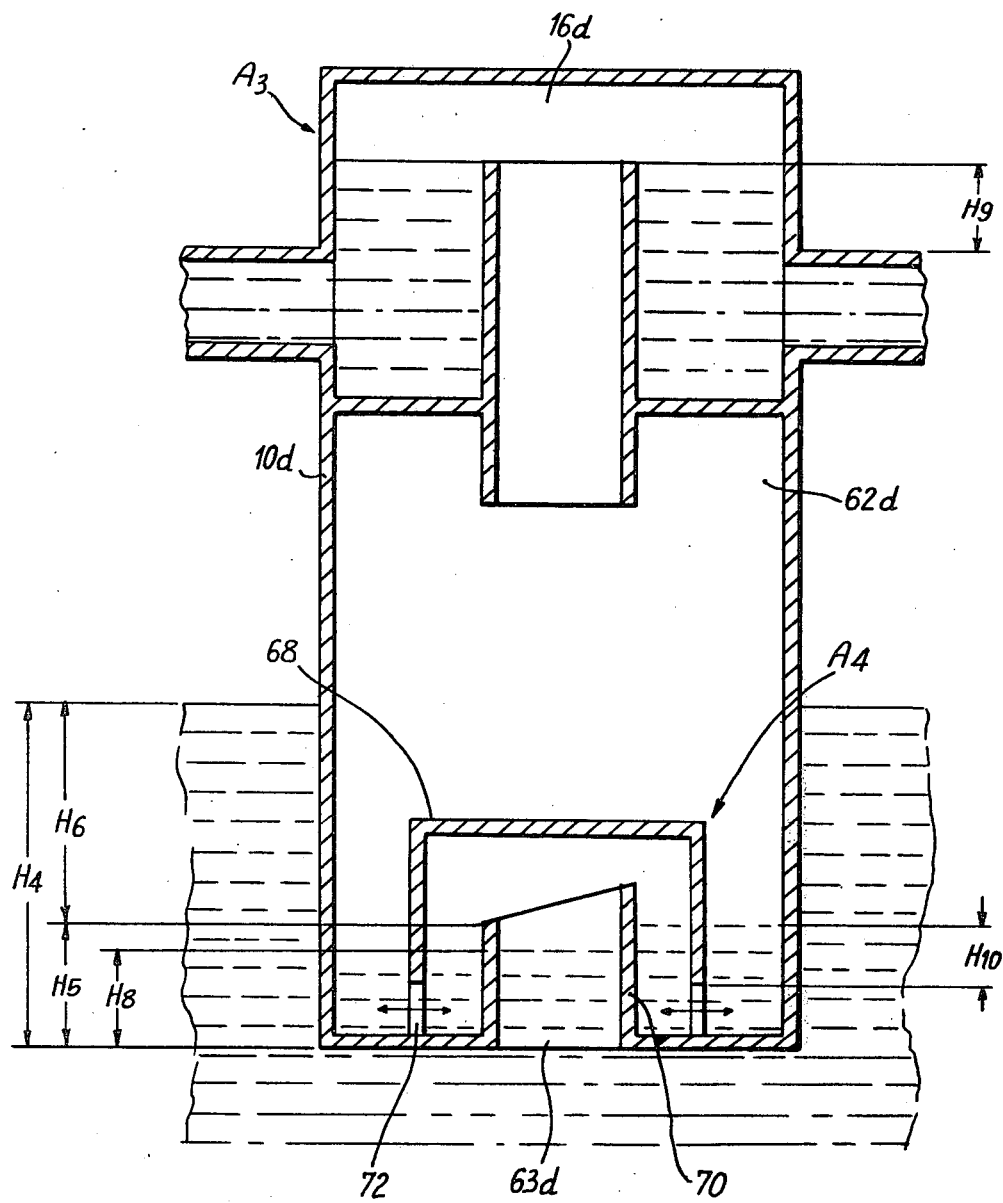

DEVICE FOR SELF-LEVELING OF ELECTROLYTE IN ELECTRIC ACCUMULATORS

This invention relates to a hydraulic device applicable for self-levelling or self-topping up of electrolyte of general batteries in electric accumulators.

Referring to batteries of electric accumulators, particularly stationary or semi-stationary batteries, wherein remarkable time intervals may elapse between one and the next topping up or levelling of the electrolyte, the reduction in the electrolyte level may cause troubles and damages to the battery and also to the users therefrom supplied. These troubles would more occur in case of floating or buffer batteries of accumulators, and particularly in batteries associated with continuously operated electric generators, such as solar cells, wherein the relative plants are installed at locations that are unmanned or hardly accessible for rational and efficient maintenance. Further, in some types of accumulators, such as Pb-Ca batteries, as well in those of low percentage of antimony, while being the latter an acceptable solution for some use requirements, there however occurs upon water dissociation an undesireable increase in electrolyte concentration.

It is the object of the present invention to obviate these and further drawbacks and automatically ensure the electrolyte levelling or topping up in the accumulator to provide, within determined limits, a constant electrolyte concentration throughout the accumulator operation.

In is another object of the invention to provide a device for the above specified uses, which is of limited overall size, so that it can be applied to common stationary and semi-stationary accumulator batteries for traction and also to the transportable type of batteries. This is of substantial interest in case of batteries mounted on general vehicles, particularly railway cars, where the topping up operation is laborious also because of having to remove the accumulator from the vehicle.

It is a further object of the invention to provide a device of the above specified type which, while still assuring the advantages set forth, can be also applied to accumulators of any type and at present marketed.

A device according to the invention is characterized by having, in combination with the accumulator, a topping up liquid reservoir hydraulically and by gravity connected with a pneumatic chamber provided with levelling members assuring in said chamber a constant level of topping liquid and a predetermined pneumatic pressure, said levelling members being connected with the interior of the accumulator to detect the changes in level of the electrolyte, so that when the level of said electrolyte falls down below determined limits, a reduction in pressure occurs in said pneumatic chamber allowing the reservoir liquid to transfer into the accumulator until the electrolyte of the latter, on reaching the predetermined level, re-establishes in said pneumatic chamber the required pressure to cut off any further introduction of liquid into the accumulator.

In practice, such a concept is liable to many embodiments, all of which are within the scope of the present invention.

For example, the pneumatic chamber and conveniently also the topping up liquid reservoir may be integrally formed with the top portion of the accumulator housing, particularly where such a housing is made of molded plastic materials. Particularly in case of semi-stationary and also transportable accumulators, the device has a housing within which the pneumatic chamber and a vent chamber for the gases developed by the electrolyte are provided, at the bottom such a housing having a plug-shaped extension, through which a piezometric tube passes and immerges into the electrolyte, which extension removably and sealingly engages the vent gate of the accumulator battery.

The invention will now be explained with reference to the appended drawings showing by way of example some embodiments of a device according to the invention.

In the accompanying drawings:

FIG. 6 is a schematic sectional view of an element integrating the device of FIG. 5 for heat compensation.

Figure 1:
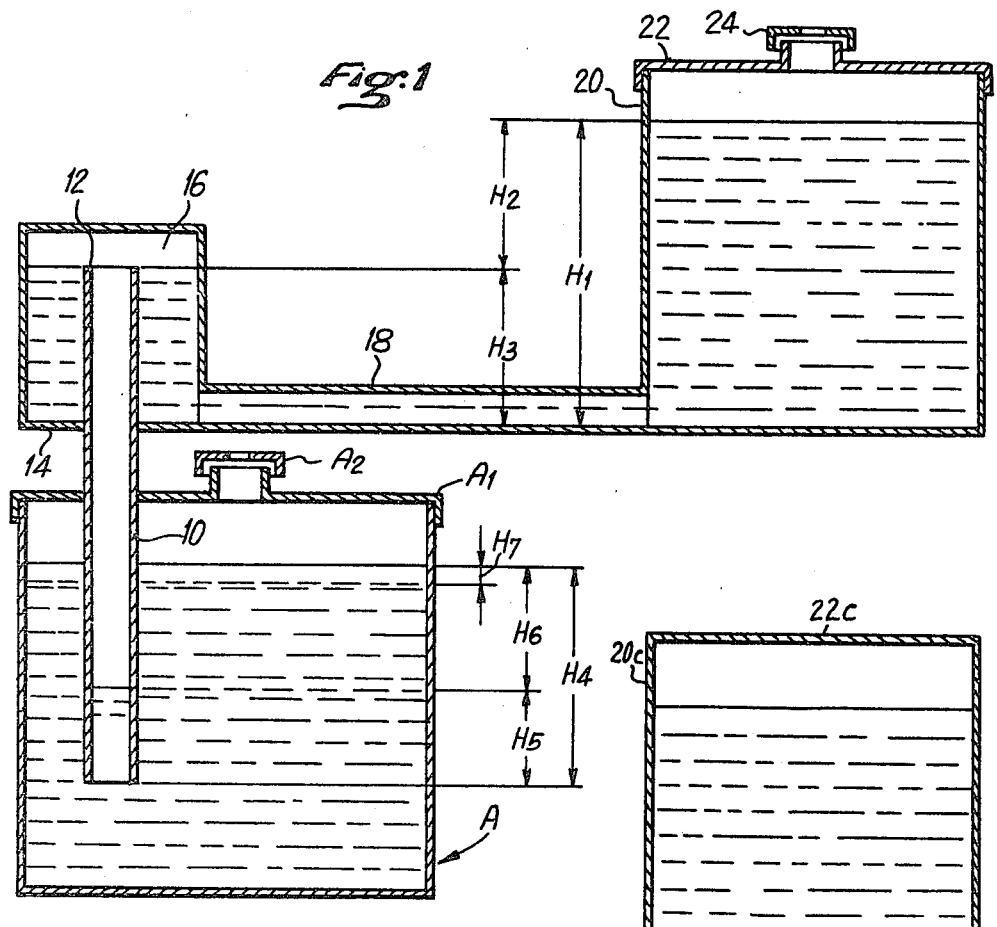
FIG. 1 is a schematic sectional view showing the hydraulic connections between the accumulator and device according to the invention.

The scheme related to of FIG. 1 shows at A the electic accumulator and at A1 its cover or lid, which as well known has a suitably shaped plug A2 for the vent of gases being developed by the accumulator electrolyte. For simplicity of representation, the accumulator plates have not been shown.

According to the invention, a tube 10 is immersed for some length into the electrolyte of accumulator A, the tube forming as stated in the following a piezometric tube which is suitably secured to the accumulator cover or lid A1. At the top this piezometric tube 10 terminates with a section 12 which through the bottom 14 of a housing 16 opens within the latter at an appropriate height or level, and this in connection with the explanation hereinafter given. This housing 16 is closed and forms a pneumatic chamber, in which a pneumatic pressure is built up and varies with the change of the liquid level provided time by time in said chamber.

The liquid head within chamber 16 is provided by a conduit 18 connecting the bottom 14 of said chamber with the bottom of a reservoir 20 for the accumulator topping up liquid, such as distilled water. Reservoir 20 is positioned at a higher level than chamber 16 by a suitable height and is closed by a lid 22 fitted with a plug 24 having a vent hole for the passage of ambient air with said reservoir in connection with the functional characteristics of the device.

The foregoing parts are arranged and positioned to one another at determined heights and such that suitable liquid levels are set therein. Particularly, and still referring to FIG. 1 of the drawings, reference letter H1 denotes the maximum level taken by the topping up liquid in reservoir 20, H2 the height as determined by the liquid in reservoir 20 at the top of the levelling conduit 12 and corresponding to the pressure within the pneumatic chamber 16. Reference letter H3 denotes the maximum height of the liquid head within chamber 16 as determined by the levelling conduit 12, whereby H1=H2+H3. Reference letter H4 denotes the level of the electrolyte of accumulator A between the liquid surface and the drawing end of the piezometric tube 10. Reference letter H5 denotes the pressure head achieved by the electrolyte within the piezometric tube 10 during the accumulator operation, and H6 denotes the back pressure exerted by the electrolyte in said pneumatic chamber 16, and H7 the change in level of the electrolyte according to which the device is operated.

Head H1 is held constant either supplying in turn the reservoir(s) 20 with one or more cistern reservoirs or if said reservoir 20 is made as explained in the following with reference to FIG. 3.

Referring to the foregoing, the device operating characteristics will now be envisaged. Initially and with pressure head H6=0, the full pressure of the liquid column H1 of reservoir 20 is effective within the piezometric conduit 10, thus lowering the level of the electrolyte therein. Thereby, the following three conditions would occur:

H6<H4;
H6=H4;
H6>H4

When H6>H4 and accordingly H5=0, a determined volume of air bubbles out of the piezometric conduit 10 into the accumulator electrolyte exhausting in the air through the vent plug A2. A corresponding volume of topping up liquid passes by gravity from reservoir 20 into pneumatic chamber 16 and accumulator A. The passage of topping up liquid from reservoir 20 to accumulator A until the condition H6<H4 is achieved. As soon as this condition is achieved, the passage of air from said pneumatic chamber 16 and through accumulator A into the ambient is cut off, while at the top of said chamber a pneumatic pressure is built up corresponding to the specific gravity $\gamma$ and height of the liquid column H6, where the level of the electrolyte surface of the accumulator is increased by the section H7, whereby a balance is established between the pressures determined by the liquid columns H6 and H2.

Let us now consider the levels occuring during the operation of accumulator A. Particularly, when H6<H2, the pressure of the liquid column H2 prevails over the pneumatic pressure in the pneumatic chamber 16, whereby an overflow of the topping up liquid is caused from reservoir 20 through the piezometric conduit 10 into the accumulator. Topping up is stopped as soon as an equilibrium state is established between H6 and H2.

On the other hand, when H6>H2, the pressure of the liquid column $\gamma$H6 lowers the liquid level H3 in the pneumatic chamber 16, so that the liquid surface in said pneumatic chamber is below the top of the levelling tube 12, thus cutting off the inflow of topping up liquid into the accumulator A.

In practice, with H2 constant since H1 is constant, also H6 is nearly constant and accordingly the level of the liquid within the accumulator.

The balance condition given by $\gamma$H6=H2 will impose a value of H6 which is inversely proportional to the specific gravities $\gamma$ for the two liquids. It clearly appears that the maximum value for H2 and hence the height of reservoir 20 is only limited by the maximum immersion height H4 taken by the piezometric tube 10 within the accumulator electrolyte. Thus, the optimum condition for ensuring a successful operation of the device is given by H2=$\gamma$H6<$\gamma$H4. Therefore, the net volume of the pneumatic chamber 16, that is the liquid volume between the maximum level and minimum level (corresponding to height H3) should be lower than the inner volume of the immersed portion H4 of the piezometric tube 10 within the accumulator electrolyte.

Figure 2:
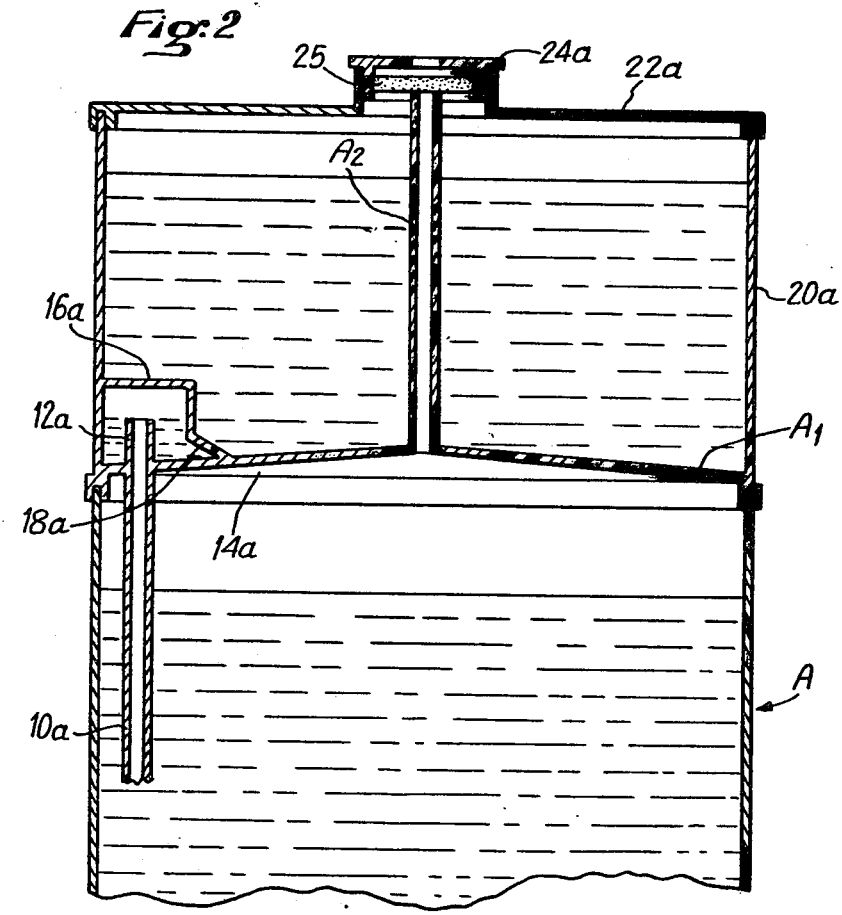
FIG. 2 is a fragmentary cross-sectional view of an accumulator equipped with the device according to the invention.
Figure 3:
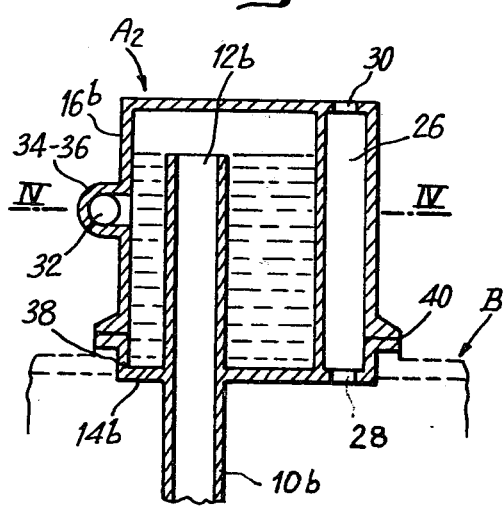
FIG. 3 is a sectional view of a modified embodiment of the device which also forms the plug applicable to the accumulator battery.
Figure 4:
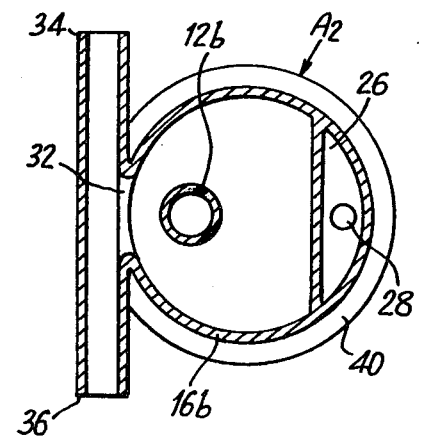
FIG. 4 is a sectional view taken along line IV—IV of FIG. 3.

Considering now the variants of FIGS. 2 through 4, the parts like to those of FIG. 1 have been designated by like references. Particularly, in the case of FIG. 2, the piezometric tube 10a is intergral with the accumulator lid A1, also forming the bottom for the reservoir 20a of the topping up liquid. Within and at the bottom of said reservoir, the pneumatic chamber 16a is provided and has disposed therein the levelling tube 12a forming the extension of the piezometric tube 10a which, in this case, is provided at least partially flexible for introduction into the accumulator A to the intended depth. Such a pneumatic chamber is in communication with the inside of reservoir 20a through a bottom hole 18a. The lid A1 is provided with a vent tube A2 which, by passing through said reservoir 20a, communicates with the atmosphere through a block of porous material 25 retained by the plug 24a closing said reservoir 20a and also allowing the ambient air to enter therein for replacement of the liquid transfered to the accumulator A.

Of course, where the accumulator battery has one or more elements or cells, the topping up for each cell is accomplished by a relevant device comprising the piezometric tube 10a and relative pneumatic chamber 16a, while the reservoir 20a may also be common for all of the battery elements or cells.

In the variant according to FIGS. 3 and 4, the pneumatic chamber 16b is associated with a second chamber 26 forming an expansion or vent chamber communicating with the inside of accumulator A through a hole 28 drilled in the bottom wall 14b of said chamber and with the ambient through a hole 30 at the top of said vent chamber 26.

Laterally and below the levelling tube 12b, said pneumatic chamber 16b has an aperture 32 coupling such a chamber with a double connection 34-36 to retain pipings even of flexible type and serally interconnecting the chambers 16b of the devices of the involved elements or cells A with the topping up liquid reservoir 20b, not shown.

The housing forming said chamber 16b and vent chamber 26 is shaped to terminate with a further cylindrical extension 38 provided with a stop rim 40, thereby to form a plug which is removable and forcibly engageable with the gate B at the top of the housing relative to the involved element or cell of accumulator. A. Summarizing, the device shown in FIGS. 3 and 4 forms the plug A2 closing the housing of the accumulator element or cell and of which the bottom wall 14b retains the piezometric tube 10b immersed in a predetermined section of the electrolyte of the involved battery element or cell. Obviously, said plug A2 may be otherwise shaped to be removably restrained to the vessel gate; for example, such a plug could be threaded for removable coupling with the relevant gate B.

Figure 5:
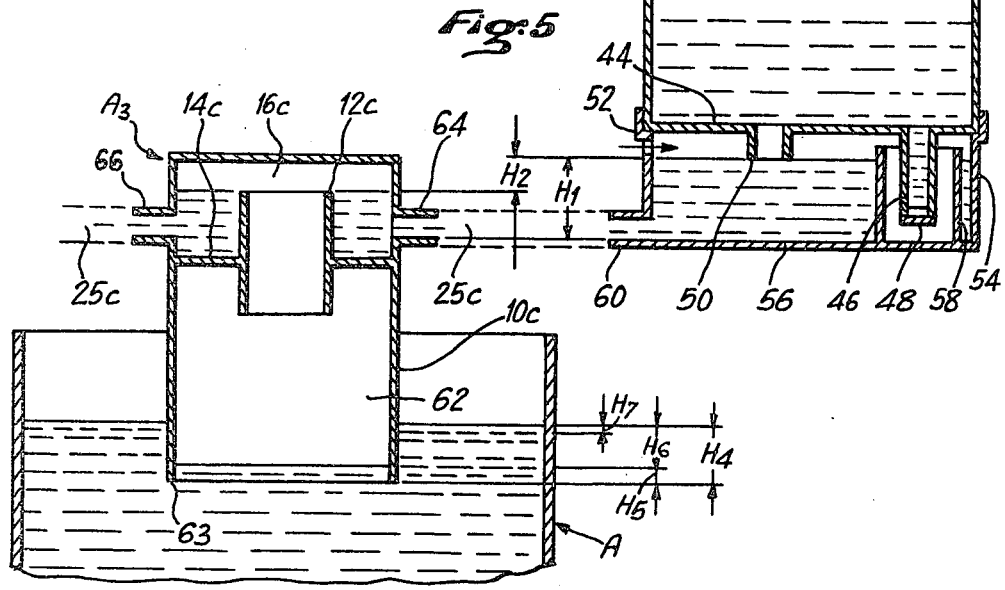
FIG. 5 is a sectional view showing a further modified embodiment of the device applicable to stationary and traction batteries.

FIG. 5 is a schematic sectional view showing a further modified embodiment of the device applicable to stationary and traction batteries, as well as to other batteries where the available space is inadequate for introducing the piezometric tube or probe 10 into each of the elements or cells.

The device shown is similar to that of FIGS. 3 and 4, except that the reservoir 20c is sealingly closed by a top wall 22c. On the other hand, the bottom 44 of reservoir 20c is provided with a gate 46 with closing plug 48, and such a bottom also has a tubular extension 50 located at a suitable position and of convenient length for the purposes which will now be set forth.

The reservoir 20c is retained by the shaped edge 52 of a cistern 54 forming the support for said reservoir 20c, so that the latter can be located at a higher position than the element(s) or cell(s) of battery A and may be also removed from said cistern to be filled up with topping up liquid, such as distilled water or the like.

This reservoir 20c and cistern 54 may be integral to each other, and in this case said reservoir 20c can be filled either by overturning the assembly, or even by rotating it through only 90° if gate 46 is presented by one of the peripheral walls 52 of said cistern. The bottom 56 of cistern 54 is provided with a collar 58 ensuring the communication with atmosphere for such a cistern and freely accomodating therein the gate 46 presented by reservoir 20c in order to build up a liquid head H1 in said cistern which is constant and defined at the top by the edge of said tubular extension 50. The peripheral portion of cistern 54 has one or more connections 60 disposed below the surface of the liquid head of said cistern.

Through a rigid and/or flexible piping 25c, the connection 60 hydraulically connects said cistern 54 with the element(s) or cell(s) A comprising the involved battery. Preferably, each of said elements or cells A retain on its lid a body A3 which, as above stated, may form the plug for the accumulator housing A. Such a body A3 is divided by a diaphragm 14c into two overlapping chambers, the upper chamber 16c of which is the pneumatic chamber of the device, while the lower chamber 62 is at the bottom provided with an aperture 63 immersed for some section in the electrolyte of the involved element or cell A.

At one side the upper chamber 16c of body A3 is connected by connections 64 and 60 with the interior of cistern 54, and at the other side by a second connection 66 and relative piping 25c with the upper chamber 16c of the body A3 associated with the element or cell A next to that involved.

The two chambers 16c and 62 of body A3 are interconnected by two parallel coaxial tubular elements 10c and 12c, which are integral to the wall or diaphragm 14c, so as to form two vertical conduits for free passage between the two chambers of both the topping up liquid and air present within the device.

The bottom portion of piezometric tube 16c is for some section immersed in the electrolyte of element or cell A to provide head H4.

H5 denotes the height or level attained by the electrolyte within said tube 10c during the device operation.

H6 denotes the back pressure exerted by the electrolyte within the pneumatic chamber 16c, and H7 the change in level of the electrolyte, incident to which the device is operated.

By the difference in height H2 between the free surface of the supply cistern 54 and the upper edge of tubular section 12c, the pressure exerted in chambers 16c and 62 is indicated.

Similarly as above described, the balance condition is achieved when $H2 = \gamma H6$.

As above stated, body A3 may be shaped also to form a plug removably applicable to the gate of element or cell A; moreover, such a plug should obviously assure the above mentioned liquid level conditions, and particularly provide the hydraulic heads H2 and H6.

As a result, the functional behaviour of the device shown in FIG. 5 is similar to that previously considered. Particularly, when the reservoir 20c (filled with the topping up liquid and placed in said cistern 54) is at the position shown in FIG. 5, a portion of the liquid stored in such a reservoir is outletted by gravity and collected in the underlying cistern 54. As soon as level H1 is attained, at which the liquid surface in cistern 54 is coincident with the edge of tubular extension 50, the delivery of liquid is stopped. Due to the hydraulic connection between said cistern 54 and bodies A3 of the several battery elements or cells A as the liquid is transferred into the cistern, also all of the upper chambers 16c of said bodies are filled up, and this until the edges of the top tubular sections 12c are passed by some length, then to overflow into the underlying elements or cells A and establish in the latter the levels A4. As soon as this level is attained in any of elements or cells A, a pneumatic pressure is built up in the top portion of chamber 16c of the relevant body A3, which acts upon the liquid surface in said chamber, thus stopping the liquid transfer by gravity into the underlying element or cell A. When level H4 is attained in all of elements or cells A, the liquid in cistern 54 increases in level and engages the edge of the tubular extension 50, thus definitively cutting off the passage of liquid into such a cistern. Obviously, when the electrolyte level in any of elements or cells A drops to below its predetermined level, so that pressure H2 is no longer balanced, the pneumatic balance in chamber 16c will be upset, which causes an increase in the liquid level in such a chamber that, by overflowing into the underlying element or cell A, will thereby automatically re-establish the electrolyte level, and as soon as the balance conditions $H2 = \gamma H6$ occur, the liquid outflow is stopped. The liquid head H2 in cistern 54 remains unaltered until complete emptying of reservoir 20c.

In order to avoid the drawbacks due to thermal variations, and particularly volume variations caused by heating of air in chambers 16c and 62 of body A3 of FIG. 5 (possibly also in the case of the device shown in FIGS. 1 to 4) capable of causing an undue variation in the electrolyte level H4 in the accumulator, the device according to the invention is integrated with a compensation member A4. Such a member is shown in FIG. 6 and comprises a cap 68 placed on the bottom of chamber 62d, thereby to cover an overflow conduit 70 establishing the communicating between chamber 62d and interior of element or cell A, that is with the accumulator electrolyte since the edge of said cap is provided with slits 72.

During the accumulator operation, particularly as the accumulator is being charged, should an increase occur in the air temperature in chambers 16d and 62d, this would cause an increase in pressure in such chambers, with resulting simultaneous lowering of the liquid levels H8 and H9 in said chambers and increase in the level of liquid within said cap 68. The increase in this latter level causes an overflow of liquid into vessel A through said overflow tube 70. Accordingly, while transferring liquid from the inside of cap 68 into the vessel A, the level H8 remains constant.

The maximum expansion for the air in said pneumatic chambers 16d and 62d corresponds to the sum of the liquid volumes in said cap 68 and chamber 62d, and height or level H10.

In case of reduction in air volume in pneumatic chambers 16d and 62d, this would cause first an increase in levels H9 and H10 and then in level H8 for the liquid in chamber 62d, thus inhibiting a not required topping up of liquid in accumulator A.

In connection with the requirements as the case may be, the compensation member A4 may be modified and varied. For example, it could also comprise a resiliently deformable plenum chamber disposed between chamber 62d and the inside of accumulator A.

The possibility is thus confirmed that the functionality of accumulator batteries can be maintained efficient and for an extended period of time, particularly where requiring a frequent liquid topping up in unattended installations.

Modifications and changes can be made to the described and shown device in order to meet requested use requirements. For example, in the case of FIG. 3, the reservoir 20 may be located at a suitable higher position than the level taken by the electrolyte in the several battery elements or cells. Such a reservoir, as well as that of FIG. 2, may be associated with the constant level supply device 50, 56 shown in FIG. 5. Additionally, the inventive device could be made so as to be an integrated part of the housing accomodating the involved battery element or cell. Finally, the device according to the invention may find other applications in addition to those herein specifically considered. Therefore, under this aspect the present invention is to be understood as extended to an accumulator which incorporates or is provided with the self-levelling device according to the present invention, still remaining within the scope of the invention and accordingly within the covering field of the invention patent.

What is claimed is:

1. A device for self-levelling and topping up electrolyte in an accumulator battery, comprising:
   an accumulator container for containing electrolyte;
   a pneumatic chamber and means for providing topping up liquid to the pneumatic chamber at a predetermined pressure;
   a conduit communicating from the pneumatic chamber to the accumulator container; a top of the conduit extending a distance up into the pneumatic chamber such that when the liquid in the pneumatic chamber rises above the top of the conduit, liquid enters the conduit from the pneumatic chamber; the conduit being oriented such that when liquid enters the conduit at the top thereof, it moves into the accumulator container and increases the level of filling of the accumulator container;
   a bottom of the conduit extending a distance into the accumulator container such that as the liquid level in the accumulator container increases above the height of the bottom of the conduit, this generates a back pressure in the conduit which, in turn, generates a back pressure in the pneumatic chamber above the liquid in the pneumatic chamber;
   whereby when the level of liquid in the accumulator container declines, this reduces the back pressure in the pneumatic chamber, and the liquid level in the pneumatic chamber increases due to the providing means providing liquid to the pneumatic chamber until the level of liquid in the pneumatic chamber rises enough for liquid to enter the top of the conduit and to move through the conduit into the accumulator container; and as the level of liquid in the accumulator container increases above the bottom of the conduit and the back pressure in the conduit thereby increases, the liquid level in the pneumatic chamber is decreased below the top of the conduit, stopping entrance of liquid into the conduit.

2. The device of claim 1, wherein the providing means comprises a reservoir for containing liquid for topping up the accumulator and adapted to provide liquid under pressure to the pneumatic chamber; the pneumatic chamber being connected with the reservoir for enabling a supply of liquid to be provided from the reservoir to the pneumatic chamber.

3. The device of claim 1, wherein the accumulator container has a lid thereon with an opening therein, and the pneumatic chamber includes a housing positionable within the lid opening and engageable with the lid for plugging the lid opening.

4. The device of claim 1, wherein the pneumatic chamber and the first portion of the conduit, which is the portion of the conduit extending into the accumulator container, are defined in a single housing; a diaphragm formed in that housing and separating the pneumatic chamber from the first conduit portion; the second portion of the conduit, which extends into the pneumatic chamber, being connected and supported at the diaphragm and being of smaller cross-section than the first portion of the conduit.

5. The device of claim 1, wherein the providing means is connected to the pneumatic chamber at a height beneath the height of the top of the conduit.

6. The device of claim 5, wherein the conduit extends up into the pneumatic chamber and down into the accumulator container.

7. The device of claim 5, wherein the providing means comprises a reservoir for containing liquid for topping up the accumulator and adapted to provide liquid under pressure to the pneumatic chamber; the pneumatic chamber bein connected with the reservoir for enabling a supply of liquid to be provided from the reservoir to the pneumatic chamber.

8. The device of claim 7, wherein the reservoir has a liquid level therein that is higher than the top of the conduit, whereby liquid transfers from the reservoir to the pneumatic chamber under pressure due to the weight of water in the reservoir.

9. The device of claim 8, further comprising a cistern connected with the reservoir and including means for maintaining a constant height level of liquid in the reservoir.

10. The device of claim 8, wherein the conduit extends up into the pneumatic chamber and down into the accumulator container.

11. The device of claim 8, wherein the pneumatic chamber is located adjacent the bottom of the reservoir; the pneumatic chamber being connected with the reservoir via an opening generally at the lower end of the pneumatic chamber.

12. The device of claim 11, wherein the reservoir includes a bottom wall, and the bottom wall also at least in part forms a lid over the accumulator container;
   the conduit being supported on the lid for extending up into the pneumatic chamber and down into the accumulator container.

13. The device of claim 7, further comprising air vent means communicating with the reservoir and with the accumulator container for venting gas pressure built up the accumulator container to the ambient environment and for enabling air in the ambient environment to enter the reservoir.

14. The device of claim 7, wherein the accumulator container has a lid thereon with an opening therein and the pneumatic chamber includes a housing positionable within the lid opening and engageable with the lid for plugging the lid opening.

15. The apparatus of claim 5, wherein the accumulator container has a lid thereon wwith an opening therein and the pneumatic chamber includes a housing positionable within the lid opening and engageable with the lid for plugging the lid opening.

16. The apparatus of claim 15, wherein the pneumatic chamber housing includes a gas vent chamber therein which is separated from the pneumatic chamber, and the gas vent chamber communicates through vent openings between the accumulator container and the ambient environment.

17. The device of claim 15, wherein the providing means comprises a double connection at the pneumatic chamber for enabling connection of the pneumatic chamber with other pneumatic chambers of others of the devices.

18. The device of claim 5, wherein the pneumatic chamber and the first portion of the conduit, which is the portion of the conduit extending into the accumulator container, are defined in a single housing; a diaphragm formed in that housing and separating the pneumatic chamber from the first conduit portion; the second portion of the conduit, which extends into the pneumatic chamber, being connected and supported at the diaphragm and being of smaller cross-section than the first portion of the conduit.

19. The device of claim 18, wherein the providing means comprises a reservoir for containing liquid for topping up the accumulator and adapted to provide liquid under pressure to the pneumatic chamber; the pneumatic chamber being connected with the reservoir for enabling a supply of liquid to be provided from the reservoir to the pneumatic chamber;
a cistern connected with the reservoir and including means for maintaining a constant height level of liquid in the reservoir.

20. The device of claim 19, wherein the maintaining means comprises a cistern comprising a liquid filled container above the reservoir; the cistern container having a nozzle projecting below the cistern and into the reservoir for exit of liquid from the cistern, such that when the level of liquid in the reservoir builds up high enough, it blocks exit of liquid from the nozzle and blocks return flow of air through the nozzle into the cistern.

21. The device of claim 19, wherein the providing means comprises a connection from the reservoir to each of the pneumatic chambers of a plurality of the pneumatic chambers; a plurality of the devices, each being provided with the respective one of the plurality of pneumatic chambers.

22. The device of any of claims 1, 7, 8, 13 or 21, further comprising compensating members for compensating for changes in volume in the accumulator container and the pneumatic chamber caused by heating up of air and gas therein.

23. The device of claim 22, wherein the compensating members comprise an overflow tube located on the bottom of the conduit for being partially immersed in liquid in the accumulator container; a cap in the conduit, covering over and spaced from the open top of the overflow tube, and the overflow tube extending up from the bottom of the conduit into the cap; the cap defining a second pneumatic chamber which is in liquid communication with the interior of the accumulator container.

* * * * *